United States Patent [19]

Sanderson

[11] Patent Number: 4,613,452

[45] **Date of Patent: * Sep. 23, 1986**

[54] AQUEOUS ACIDIC HYDROGEN PEROXIDE COMPOSITION CONTAINING ENOL ESTER ACTIVATOR

[75] Inventor: William R. Sanderson, Warrington, England

[73] Assignee: Interox Chemicals Limited, London, England

[ * ] Notice: The portion of the term of this patent subsequent to Jan. 29, 2002 has been disclaimed.

[21] Appl. No.: 664,397

[22] Filed: Oct. 23, 1984

[30] Foreign Application Priority Data

Oct. 26, 1983 [GB] United Kingdom ................. 8328654

[51] Int. Cl.[4] ................................................ C09K 3/00

[52] U.S. Cl. ........................... 252/186.23; 252/186.41

[58] Field of Search ....................... 252/186.23, 186.41

[56] References Cited

U.S. PATENT DOCUMENTS

| | | | |
|---|---|---|---|
| 4,283,301 | 8/1981 | Diehl | 252/186.23 X |
| 4,367,156 | 1/1983 | Diehl | 252/186.41 X |
| 4,496,473 | 1/1985 | Sanderson | 252/186.41 |

FOREIGN PATENT DOCUMENTS

| | | | |
|---|---|---|---|
| 92932 | 11/1983 | European Pat. Off. | 252/186.41 |
| 3003351 | 8/1981 | Fed. Rep. of Germany | |
| 836988 | 6/1960 | United Kingdom | |

*Primary Examiner*—John F. Terapane
*Assistant Examiner*—Matthew A. Thexton
*Attorney, Agent, or Firm*—Larson and Taylor

[57] ABSTRACT

The effectiveness of hydrogen peroxide for bleaching and disinfecting at ambient to hand hot temperatures can be enhanced by reaction with an enol ester a peracid generator (activator). The present invention provides emulsions of enol ester activators in aqueous acidic solutions of hydrogen peroxide containing a water soluble emulsifier in at least 1 part per part by weight of activator. The enol esters have either of the general formulae:

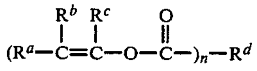

(i)

or

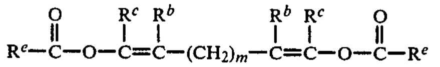

(ii)

Preferably, sufficient emulsifier mixture thereof is present to enable the resultant emulsion to be clear demonstrating the presence of thermodynamically stable micellar structures. In preferred compositions, the activator is selected from vinyl or isopropenyl or but-1-enyl or cyclohex-1-enyl acetate heptanoate, octanoate or benzoate and divinyl adipate or phthalate, and 1,5-diacetoxypenta-1,4-diene. The compositions can be used as such or upon dilution with aqueous media and in conjunction with detergent compositions, and for cleaning and disinfecting absorbent or non-absorbent materials.

14 Claims, No Drawings

AQUEOUS ACIDIC HYDROGEN PEROXIDE COMPOSITION CONTAINING ENOL ESTER ACTIVATOR

The present invention relates to hydrogen peroxide compositions and more particularly to aqueous hydrogen peroxide compositions containing additionally a peracid generator, and to processes for the manufacture of such compositions and their use in washing, bleaching, or disinfection.

In earlier European Patent Application 83302056.3, publication No. 0092932, in the name of Interox Chemicals Limited, the difficulties of providing a liquid system that can generate peroxy acids for use in low temperature bleaching or in disinfection have been reviewed. The specification also drew attention to earlier references to members of the class of activators subsequently described therein, namely enol esters having either of the general formulae:

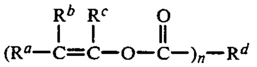
(i)

or

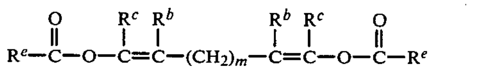
(ii)

in which each of $R^a$ and $R^b$ represent hydrogen or a $C_1$ to $C_5$ alkyl radical or a $C_2$ to $C_4$ alkenyl radical or a phenyl radical, $R^a$ and $R^b$ being the same or different or combining together to form a carbocyclic di-radical, $R^c$ represents hydrogen or a $C_1$ to $C_5$ alkyl radical or a phenyl radical or is combined with $R^a$ or $R^b$ and the olefin group to form a carbocyclic radical, $R^e$ represents hydrogen or a $C_1$ to $C_3$ alkyl radical or a phenyl radical, n is 1 or 2, when n=1, $R^d$ represents hydrogen or a $C_1$ to $C_3$ alkyl radical or a phenyl radical, when n=2, $R^d$ represents a $C_2$ to $C_{10}$ alkylene di-radical or a phenylene di-radical, and m is an integer from 0 to 8.

In the invention described in said European Patent Application, the enol esters are present dispersed in an aqueous acidic solution of hydrogen peroxide. By so forming an emulsion, it was found that it was possible to provide a composition containing the essentially hydrophobic activator and aqueous hyrogen peroxide under such conditions that it was storage stable relative to avox (available oxygen) loss, but which still generated a peroxy acid when the solution was rendered less acid or became mildly alkaline, such as would be the case when it was employed in conjunction with a conventionally available household detergent composition. The specification further indicated that the term 'emulsifier' in respect of the activator meant that the emulsifier and activator had HLB values the same as or not differing in practice significantly from each other such that the activator is dispersed in the composition. For the avoidance of doubt, it is recognised that the matching of the HLB values for the emulsifier system and the activator becomes more critical as the amount of emulsifier system relative to the amount of activator is decreased. Thus, at very low weight ratios of emulsifier system to activator, satisfactory emulsion and in particular the formation of a kinetically stable emulsion demands that the matching be relatively tight. The corollary is, however, also recognised namely that where the emulsifier system is present in an excess amount relative to the activator the matching between the components can be relaxed, in some instances substantially and still permit an emulsion to be formed.

It will be recognised from a detailed study of the text of said European Patent Application, that various preferred limits were indicated for the concentration of the various components within the composition. Thus, for example, the preferred range for the aqueous phase, namely aqueous hydrogen peroxide, was from 40–95% by weight of the composition, the balance being made up by the organic phase which comprised mainly the activator and the emulsifier therefor together with any other organic materials incorporated within such a range, the organic phase is dispersed and the aqueous phase continuous. It was further suggested that the emulsion preferably contained from 3–35% of the activator and often at least 10% activator indicated that the minimum amount of emulsifier was usually around 5–10% by weight thereof, based upon the activator, naturally where the two components had matched HLB values. Somewhat later in the specification, it was indicated that transparent emulsions were generally unattainable unless the amount of emulsifier present represented at least half the weight of the activator and various examples were presented in which the weight of emulsifier system represented 50 to 70% of the activator. Thus, it will be apparent to the reader that said EPA was concentrating upon compositions in which the ratio of activator to emulsifier was relatively low and therefore in which relatively tight matching of the HLB values was appropriate.

It is the intention of the present disclosure to rectify any inadvertent impression gained from the aforementioned EPA that suitable emulsions of the activator and aqueous hydrogen peroxide must always have very tightly matched HLB values for the activator/emulsifier system.

Accordingly, it an object of the present disclosure to draw attention to the fact that aqueous emulsions of such activators which contain a similar or even markedly higher amount of emulsifier than of activator may be suitable.

Accordingly, activator compositions described herein comprise aqueous emulsions of one or more activators in classes i and ii defined herein, together with at least its own weight of one or more emulsifiers soluble in the aqueous phase, the proportion of activator plus emulsifier in the composition comprising 5–60%, and aqueous hydrogen peroxide comprises the balance.

Herein the activators are represented by the general formulae (i) and (ii) employed in European Patent Specification 0092932, save that the alkyl radicals $R_d$ and $R_e$ is from $C_1$ to $C_8$.

Advantageously, the use of a higher ratio of emulsifier to activator enables the resultant emulsions to tolerate more readily variations in their ingredients and in the compositions containing them and variations in storage conditions. In particular, commercially available emulsifiers (surfactants) are subject to variations in their composition, be it in their residual impurity/manufacturing reagent content or in the distribution of homologues. Examples include variations in the residual alkylate in linear alkyl benzene sulphonate surfactant, variations in the residual alcohol in alcohol sulphates and variations in the distribution of homologues in ethoxylated products. Also, storage and distribution of the emulsions are likely to be subject to significant variations in temperature. The typical overall process is more susceptible to success when implemented under normal manufacturing conditions.

With the confines of the 5–60% range for the organics component, it is preferable for the overall concentration of the two components together to total at least 10% of the composition and in many embodiments will be selected within the range of 15–50% of the composition.

Theoretically at least, the concentration of activator in the emulsion can be as low as desired, but in practice is rarely selected below 1%. However, as its concentration is increased above 1%, it rapidly needs less total volume of emulsion to deliver a desired dosage of peracid generator to a washing or disinfecting solution. A proportion of activator of 1–15% w/w is suitable. The emulsion formed can either be a macro-emulsion or can contain micellar structures depending upon the nature of the emulsifier chosen and its weight ratio to the activator. By choosing water soluble emulsifiers, it is possible to form clear emulsions, i.e. those containing micellar structures with higher concentrations of activator than would be the case for solely water-insoluble emulsifiers.

The emulsifiers that can be employed in the instant invention compositions are generally selected from water-soluble nonionic and anionic surfactants, or mixtures thereof. The class of anionic surfactants includes in particular linear alkyl benzene sulphonates and alcohol sulphates, alkyl sulphosuccinates, olefin sulphates/-sulphonates, sulphated derivatives of ethoxylated fatty alcohols or alkyl phenols. Suitable classes of nonionic surfactants include ethoxylated fatty alcohols, ethoxylated alkyl phenols, condensates of fatty acids with ethylene oxide, fatty esters of polyhydric alcohols and/or ethoxylated derivatives thereof, block condensates of ethylene oxide and propylene oxide, ethylene oxide derivatives of alkanolamines and fatty acid alkanolamides as well as fatty amine oxides as examples of amphoteric surfactants. Herein, the terms for the surfactants are used in their conventional way, so that, for example, the hydrophobic moiety normally comprises a hydrocarbon of carbon chain length 8–26 carbons, which may or may not be ethylenically unsaturated or interrupted by an aromatic ring, and the degree of ethoxylation when present typically from 6–50 moles of ethylene oxide per mole of surfactant in many cases from 6–15 moles. All the classes of surfactants that have been listed in the aforementioned European Patent Specification pages 9 to 11, incorporated herein by reference, can likewise be employed herein but naturally the hydrophobic and hydrophilic moieties are selected together so as to retain water solubility. A proportion of 5–30% emulsifier is suitable.

The extent to which the matching of HLB values for the activator/emulsifier can be relaxed in the context of the present disclosure using high amounts of emulsifier can be gauged from the fact that clear emulsions can be formed from water soluble anionic emulsifiers such as alkyl benzene sulphonate, alcohol sulphates or sulphosuccinates provided that the weight ratio of the emulsifier to activator is generally at least 4:1 and in some instances from 2:1 to 4:1 also, in the range of activator concentrations from 1–10% w/w. At ratio of emulsifier to activator below those ranges but at least 1:1, the emulsion is primarily a macroemulsion, but it will be seen to comprise two phases only, i.e. does not separate readily to a three phase system. Accordingly, one desirable range of compositions contain at least 40 to 90% aqueous hydrogen peroxide, at least 1% activator and at least 4 parts by weight water-soluble anionic emulsifier per part of activator. In such a range at ambient temperature the compositions are normally clear and contain micellar structures and thereby enjoy excellent physical stability.

A similar picture emerges in respect of the nonionic emulsifiers. Thus taking divinyl adipate as a representative example, at least of aliphatic activators, the ethoxylated and water-soluble nonionic emulsifiers typically yield a clear emulsion at a weight ratio to the activator of around 3:1/4:1 or higher. Taking vinyl benzoate, it was possible even on occasions to employ a ratio as low as 3:2 for some such nonionic emulsifiers to activator. The effect of closely matching HLB values is most apparent at the boundary change between an apparent one phase to a visible two phase system, in that for such systems the possible amount of activator that can be included whilst retaining a clear composition is highest.

In addition, mixtures of the emulsifiers, such as a mixture of one or more alkyl benzene sulphonates and-/or alcohol sulphates and/or sulphosuccinates with one or more water soluble alkyl phenol and/or ethoxylated fatty alcohol or fatty acid, ethoxylated alkanolamide or other ethoxylated nonionic emulsifier, can be used. The ratios of the mixtures can be selected within wide limits, though, but generally the anionic/nonionic ratio is in the range 10:1 to 1:10. In the preferred region of e.g. 3:1 to 1:3 and by so doing, it is often possible to extend the area within which the compositions are clear rather than being strictly macroemulsions. In many instances such co-operation between the two types of emulsifiers could enable clear compositions to be formed containing 1 part activator per 2 to 3 parts by weight of the emulsifier system. An excellent example comprises a 2:1 to 1:2 ratio of a nonyl phenolethoxylate with a sulphosuccinate.

It is possible also to employ an intermediate weight aliphatic alcohol having a $C_5$ to $C_8$ chain length to co-operate with especially the anionic emulsifiers, in a weight ratio thereto often of up to 2:1.

Where a mixed emulsifier system is used, it will be recognised that some relaxation in the water solubility of one component of that system can be permitted. Thus, for example, the aliphatic alcohols referred to above, such as pentanol, would not be regarded as being strictly water soluble.

In selecting the activator, the same criteria can be applied herein as in the aforementioned European Patent Specification. Accordingly in many embodiments $R^a$, $R^b$ and $R^c$ in the formulae for the activator, are each often selected as follows: $R^a$ from hydrogen, methyl or ethyl radicals, and $R^b$ and $R^c$ from hydrogen or methyl radicals or $R^a$ and $R^c$ combine with the olefin moiety to form a $C_5$ or $C_6$ carbocyclic radical and $R^b$ from hydrogen and methyl radicals. $R^a$, $R^b$ and $R^c$ can be selected independently from each other. Various examples of moieties derived from the enols which are highly favoured include vinyl, isopropenyl, isobutenyl, n-butenyl, and cyclohexenyl moieties. $R^d$ and $R^e$ in the formulae are often selected from methyl, ethyl pentyl, hexyl, 2,4,4-trimethyl pentyl, 2-ethyl pentyl heptyl and phenyl, and $R^d$ additionally from phenylene and $C_2$–$C_4$ polymethylene radicals. In formula (ii) m is often 0, 1, or 2. It will be further recognised that it is convenient to select activators that are liquid in themselves or with the emulsifier readily form liquid droplets or readily suspended particles under the conditions of manufacture of the emulsion. Accordingly, highly favoured activators from formula (i) include vinyl acetate, isopropenyl acetate, butenyl acetate, divinyl glutarate, divinyl adipate, divinyl azelate, divinyl sebacate, vinyl benzoate, isopropenyl benzoate, divinyl phthalate or isophthalate or terephthalate, divinyl hexahydrophthalate or cyclohexenyl acetate. Other highly favoured activators include vinyl hexanoate, vinyl heptanoate, vinyl octanoate, vinyl-3,5,5-trimethyl hexanoate and vinyl-2-ethyl hexanoate and the corresponding isopropenyl esters. From formula (ii) highly favoured activators include glutardienol diacetate (1,5-diacetoxypenta-1,4-diene) and succindienol diacetate (1,4-diacetoxybuta-1,3-diene). Naturally, the propionate esters and aforementioned $C_6$ to $C_9$ chain length carboxylate esters corresponding to the aforementioned highly favoured acetate ester activators can be employed alternatively. Furthermore, any two or more of the activators can be employed in combination, if desired, for example in order to assist the formation of a liquid activator phase employing a higher molecular weight activator in conjunction with a lower molecular weight activator, or to enable a higher weight peracid such as perheptanoic or peroctanoic acid as well as a lower weight peracid such as peracetic acid.

Other examples of $R^a$ or $R^b$ include vinyl and propenyl radicals. In addition, it will also be recognised that where two enol ester groups are present in the formulae, the corresponding compounds in which only one of the enol groups or the carboxylic acid groups as the case may be is esterified are also usable as an activator. Thus, for example the monovinyl ester of adipic acid is usable and likewise the monoacetate ester of glutaraldehyde.

Various of the enol esters are commercially available. It has been found that those that are not can readily be made by one or more of the methods of esterification, having selected the appropriate enolisable carbonyl compound and the appropriate carboxylic acid chloride, anhydride or ketene under conditions known to chemists to promote enol ester formation for isopropenyl acetate and closely related compounds, or the processes disclosed in GBPS827718, or in the articles by Bedoukian in J. Am. Chem Soc 1964, V66, p1326 and by Verekenova in Zh Obeshch Khim 1963, V33, p91.

The aqueous hydrogen peroxide normally comprises from 40 to 95% by weight of the composition and correspondingly the organic phase, mainly the activator and emulsifier comprises the balance of from 60 to 5% by weight. This corresponds to a weight ratio between the organic and aqueous phase on mixing normally of from 1:20 to 2:3 and in many instances this ratio is selected in the range of 1:9 to 1:1. The concentration of hydrogen peroxide is normally at least 1%, desirably at least 3% and conveniently is not more than 20% and quite often not more than 10%, all by weight of the composition. In many of the instant compositions, hydrogen peroxide concentration is in the range of 4 to 8% by weight of the composition. A concentration of hydrogen peroxide of 1–8% w/w is suitable. The balance of the aqueous phase comprises water which in practice is often in the region of 30 to 85% of the composition weight. The aqueous phase also contains sufficient water-soluble acid to generate an acidic pH, preferably from pH2 to pH5. Such a pH may often be obtained in the aqueous phase of the emulsion in practice by dilution of commercially available hydrogen peroxide solutions which contain a small amount of acidic stabilisers such as pyrophosphoric acid and/or one or more phosphonic acids with demineralised water, and often on emulsification a small proportion of organic acid from the activator can transfer into the aqueous phase. The pH of the composition can readily be monitored and if necessary adjusted to the preferred range by suitable acid or base introduction. The aqueous phase can additionally contain a small amount of a thickener, such as about 0.5% by weight of the composition of a xanthan gum, the precise amount being variable at the discretion of the manufacturer to obtain a desired viscosity.

In the present composition it is particularly preferable to employ at least one mole of hydrogen peroxide per mole of enol ester equivalent, i.e. the product of the molar concentration of the activator and the number of enol groups per molecule. In practice a substantial excess of hydrogen peroxide is often included to allow for any loss thereof during storage and/or consumption during subsequent washing or disinfection by substances other than the activator. A further advantage of including hydrogen peroxide, which increases as its proportion increases, is that a higher concentration of the ester activator can be obtained whilst still retaining a clear micellar solution.

The instant invention emulsions are primarily directed towards two uses. In one use, the emulsion is used as a low temperature acting bleach in the washing or laundering of household fabrics or in the cleaning of non-absorbent articles in the home or in processes for cleansing and/or sterilising apparatus or other hard surfaces, such as tanks, pipes, bottles or other containers or for the bleaching of cellulose, in the form of pulp, paper, yarn, thread or cloth, under similar process conditions to those in which hydrogen peroxide or the developed peroxyacid can itself be employed. By way of example, the liquid bleach emulsion can be employed in a domestic or commercial laundry process in conjunction with any washing composition in order to enable that composition to be employed at low wash temperatures and achieve good stain oxidation. Such washing compositions can be used in their usual amounts, such as from 0.5 to 10 g/l and comprise one or more anionic surfactants, including soaps and synthetic detergents usually an alkyl aryl sulphonate, an alkyl sulphate and/or an alcohol sulphate, and/or one or more non-ionic surfactants including primary or secondary alcohol ethoxylates, or a zwitterionic detergent or an ampholytic detergent or a cationic detergent and the washing composition can also include one or more detergent builders, and conventional adjuncts such as soil anti-redeposition agents, buffers, optical brighteners, suds control agents, etc.

When the emulsion of instant invention is employed in conjunction with a solution of such an aforementioned washing composition, the resultant aqueous washing solution generally has an alkaline pH, frequently from pH8 to pH10, which promotes the perhydrolysis of the activator resulting in formation of a peracid or anionic species. Alternatively, it is possible to employ the bleach in a subsequent rinsing stage of a washing process in that there is often sufficient alkaline solution retained by the articles being washed to promote a mildly alkaline pH in at least the first rinse. In either method of use, though, it is usual to employ a concentration of hydrogen peroxide and activator which can generate theoretically a concentration of available oxygen (avox) in the washing/bleaching water in the peracid form of from 5–200 ppm and often from 10–50 ppm peracid avox. For an emulsion containing 10% hydrogen peroxide and about 18% vinyl acetate, a peracid avox in the wash solution of 25 ppm can be obtained by addition of about 0.8 g emulsion per liter of washing solution. Corresponding amounts can be calculated for other emulsions.

It will be recognised that by the use of high ratios of emulsifier to activator, it is possible to obtain bleach activator compositions which establish their own balance of nonionic to anionic surfactants when used in conjunction with conventional amounts of a base washing composition and therefore can minimise the risk of impaired cleansing of surfactant-sensitive soils which can occur if relatively low ratios of emulsifier to activator are employed.

It will be recognised, furthermore, that an alternative approach is facilitated by the use of the type of compositions described herein. In this latter approach, the bleach activator composition can be tailored for use in conjunction with a selected washing composition so that the benefits of the bleach augment the performance of that washing composition without inteferring markedly with the cleansing of surfactant sensitive stains. This can be achieved by matching the emulsifier system of the bleach composition to the surfactant mixture in the washing composition and then employing a high concentration of the emulsifier system into which is introduced the selected activator in a relatively low ratio thereto.

The second important use of the emulsions described herein is in the disinfection of aqueous media and, as briefly referred to earlier herein, the disinfection and/or sterilisation of surfaces that come into contact with humans or animals or their food or drink. In such an application, it is desirable to obtain a concentration of disinfectant species matched to the time available to carry out the disinfection. For processes in which the contact time is expected to be long, concentrations of as low as 100 ppm emulsion can be employed but where the contact time is likely to be a matter of a few seconds or at the longest a few minutes, a much higher concentration of emulsion is often preferable, for example up to a concentration of 10 gpl. Generally, disinfection or sterilising solutions can be made by simple dilution of the emulsion by an aqueous medium but if desired, sufficient alkali to generate a pH of 7–8.5 can be added. It has been found, particularly in respect of enol esters derived from dialdehydes, for example 1,5-diacetoxypenta-1,4-diene or 1,4-diacetoxybuta-1,3-diene, that pH of 7 or mildly alkaline to pH 8 tends to encourage the rate at which, and the extent to which the combination of activator plus hydrogen peroxide (or generator thereof) kills bacteria, such as spore-forming bacteria. At such pH's there would appear to be an enhanced capability.

Having described the invention in general terms, specific examples will hereinafter be described in great detail by way of illustration only.

EXAMPLES

The following Examples 1–16 were obtained by first forming a solution of the entire amount of the emulsifier in an aqueous hydrogen peroxide solution (8.4% w/w) into which was then introduced with vigorous mixing the selected amount of activator. In the case of vinyl benzoate (VB) the activator was added at ambient temperature whilst the divinyl adipate (DVAD) was warmed beforehand to make sure it was liquid and pourable. The mixture was then allowed to stand without stirring and its appearance was noted after 30 minutes.

Examples 17 to 21 were performed similarly to Examples 1 to 16, but with the interpolation of an extra step after a solution of the first indicated emulsifier had been obtained. In that extra step the desired amount of the second emulsifier/cosurfactant was introduced, with the result that the concentration of hydrogen peroxide was lowered proportionately below its initial value of 8.75% w/w, and the concentration of the first emulsifier was likewise lowered.

The emulsifiers used were:

$E_a$—linear alkyl benzene sulphonate (NANSA SS30)
$E_b$—sodium lauryl sulphate
$E_c$—nonyl/phenol ethoxylate (SYNPERONIC NP13)
$E_d$—sodium dihexyl sulphosuccinate (AEROSOL MA80)
$E_f$—alcohol ethoxylate (ETHYLAN CD916)
$E_g$—nonyl phenol ethoxylate (SYNPERONIC NP10)
$E_h$—alcohol ethoxylate (BRIJ 30)
$E_i$—alcohol ethoxylate (ETHYLAN CD 919)

The various compositions are summarised in the Table below, all of which were visually clear after 30 minutes. The %s of activator and emulsifier are those of the final composition, not parts added to 100 parts of aqueous hydrogen peroxide.

THE TABLE

| Example | Activator | (% w/w) | Emulsifier | % w/w |
|---|---|---|---|---|
| 1 | VB | 5 | $E_a$ | 13 |
| 2 | VB | 7 | $E_b$ | 12 |
| 3 | VB | 14 | $E_b$ | 18 |
| 4 | VB | 4 | $E_c$ | 20 |
| 5 | VB | 10 | $E_c$ | 12 |
| 6 | VB | 15 | $E_c$ | 18 |
| 7 | VB | 8 | $E_i$ | 12 |
| 8 | VB | 13 | $E_i$ | 19 |
| 9 | DVAD | 4 | $E_b$ | 13 |
| 10 | DVAD | 9 | $E_b$ | 19 |
| 11 | DVAD | 5 | $E_d$ | 12 |
| 12 | DVAD | 5 | $E_d$ | 19 |
| 13 | DVAD | 4 | $E_f$ | 13 |
| 14 | DVAD | 7 | $E_f$ | 20 |
| 15 | DVAD | 4 | $E_g$ | 13 |
| 16 | DVAD | 7 | $E_g$ | 20 |
| 17 | VB | 8 | $E_g/E_d$ | 13/9 |
| 18 | VB | 8 | $E_i/E_d$ | 12/11 |
| 19 | DVAD | 8 | $E_b/E_h$ | 10/23 |
| 20 | DVAD | 9 | $E_g/E_d$ | 13/11 |
| 21 | DVAD | 6 | $E_f/E_d$ | 16/12 |

From the Table, it can be seen that many clear compositions can be obtained even using anionic emulsifiers with the activators described herein. Many of these Examples have been repeated but at lower concentrations of emulsifier. In general it was found that nearly proportionate amounts of activator could be accommodated whilst still obtaining a clear emulsion, as can be seen also by comparing Examples 5 and 6, or 7 and 8 etc. Various other emulsifiers in the specified classes were tried and as a general rule it was found that performance ran parallel with their class representative specified in the Table. Thus, by way of example, other alcohol ethoxylates with a different degree of ethoxylation and/or derived from a different alcohol also produced an emulsion, but usually the maximum ratio of activator to emulsifier for which a clear composition resulted was not the same as that with $E_f$. Likewise other emusions can be produced by replacing the anionic emulsifier with a fatty acid amide, such as coconut oil ethanolamide. Likewise, similar emulsions are obtained when the activator is vinyl heptanoate, vinyl octanoate, vinyl 1-3,55-trimethyl hexanoate or vinyl-2-ethyl hexanoate instead of vinyl benzoate.

I claim:

1. A composition suitable for use in bleaching or disinfection comprising an emulsion of an enol ester activator having either of the following general formulae:

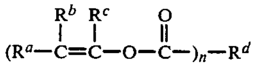

(i)

or

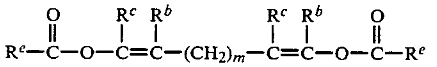

(ii)

in which each of $R^a$ and $R^b$ represent hydrogen or a $C_1$ to $C_5$ alkyl radical or a $C_2$ to $C_4$ alkenyl radical or a phenyl radical, $R^a$ and $R^b$ being the same or different or combining together to form a carbocyclic di-radical, $R^c$ represents hydrogen or a $C_1$ to $C_5$ alkyl radical or a phenyl radical or is combined with $R^a$ or $R^b$ and the olefin group to form a carbocyclic radical, $R^e$ represents hydrogen or a $C_1$ to $C_8$ alkyl radical or a phenyl radical, n is 1 or 2, when n=1, $R^d$ represents hydrogen or a $C_1$ to $C_8$ alkyl radical or a phenyl radical, when n=2, $R^d$ represents a $C_2$ to $C_{10}$ alkylene di-radical or a phenylene di-radical, and m is an integer from 0 to 8, together with at least its own weight of a water-soluble emulsifier in an aqueous acidic solution of hydrogen peroxide.

2. A composition according to claim 1 in which hydrogen peroxide is present in a mole ratio to the enol ester of at least 1:1.

3. A composition according to claim 2 in which the concentration of hydrogen peroxide is from 1 to 8% w/w in the composition.

4. A composition according to claim 1 which contains sufficient emulsifier for the emulsion to be visually clear.

5. A composition according to claim 1 in which the proportion of activator is from 1 to 15% w/w and the proportion of emulsifier is selected in the range of 5 to 30%.

6. A composition according to claim 1 in which the enol ester activator of formula (i) or (ii) satisfies the condition that $R^a$ is a hydrogen, methyl or ethyl radical and $R^b$ and $R^c$ are each hydrogen or methyl radicals.

7. A composition according to claim 1 in which the enol ester activator of formula (i) or (ii) respectively satisfies the condition that $R^d$ is an ethyl, methyl, pentyl, hexyl, 2,4,4-trimethyl pentyl, 2-ethyl pentyl heptyl, phenyl, phenylene or $C_2$–$C_4$ polymethylene radical or $R^e$ is a methyl, ethyl or phenyl radical.

8. A composition according to claim 1 in which the enol ester activator of formula (ii) satisfies the condition that m is 0, 1 or 2.

9. A composition according to claim 1 in which the activator is selected from vinyl or isopropenyl or butenyl acetate, heptanoate or octanoate, divinyl glutarate or adipate or azelate or sebacate, vinyl or isopropenyl benzoate, divinyl phthalate or iso- or tere-phthalate, cyclohexenyl acetate, glutardienol diacetate or sucindienol diacetate.

10. A composition according to claim 1 in which the emulsifier is selected from water-soluble alcohol ethoxylates, alkyl phenol ethoxylates, alcohol sulphates, linear alkyl benzene sulphonates and/or alkyl esters of sulphosuccinates.

11. A composition according to claim 10 in which the activator is selected from vinyl or isopropenyl or butenyl acetate, heptanoate or octanoate, divinyl glutarate or adipate or azelate or sebacate, vinyl or isopropenyl benzoate, divinyl phthalate or iso- or tere-phthalate, cyclohexenyl acetate, glutardienol diacetate or sucindienol diacetate, in a proportion of from 1 to 15% w/w, the proportion of emulsifier is selected in the range of 5 to 30%, and the concentration of hydrogen peroxide is from 1 to 8% w/w in the composition.

12. A composition according to claim 11 which contains an aliphatic alcohol having a $C_4$–$C_8$ carbon chain in a weight ratio to the emulsifier of up to 2:1.

13. A composition according to claim 1 which contains an aliphatic alcohol having a $C_4$–$C_8$ carbon chain in a weight ratio to the emulsifier of up to 2:1.

14. A composition according to claim 13 in which the emulsifier is anionic.

* * * * *